Dec. 25, 1962   E. C. McCALL   3,069,933
DRILL BIT GUIDING AND LOCATING APPARATUS
Filed April 24, 1961   2 Sheets-Sheet 1
FIG. 1
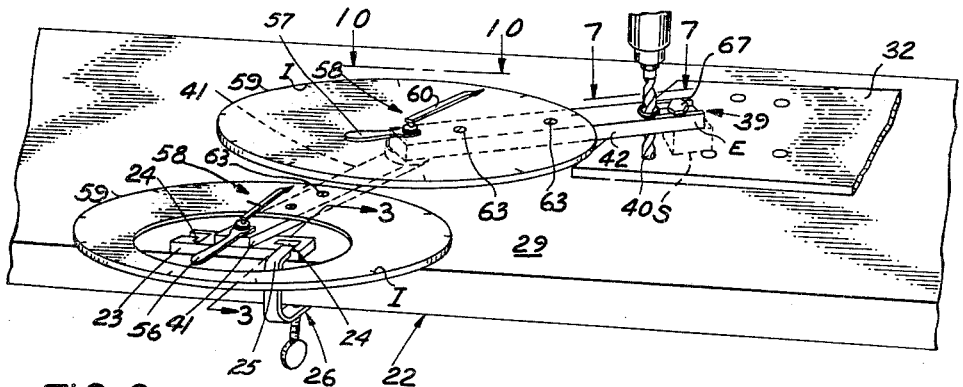
FIG. 2
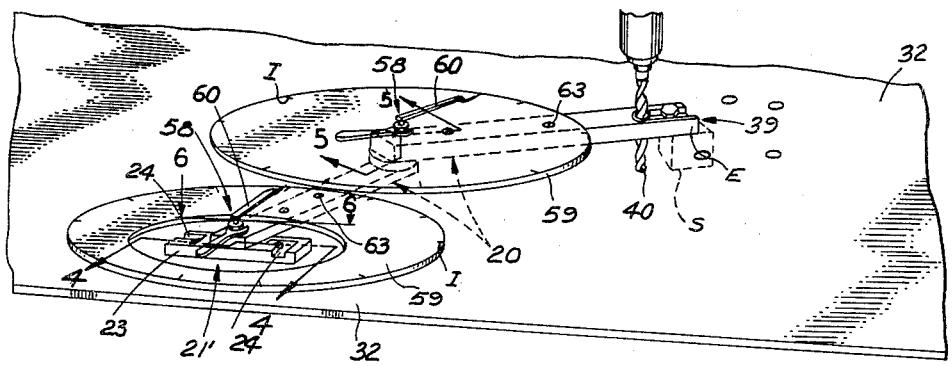
FIG. 3
FIG. 4
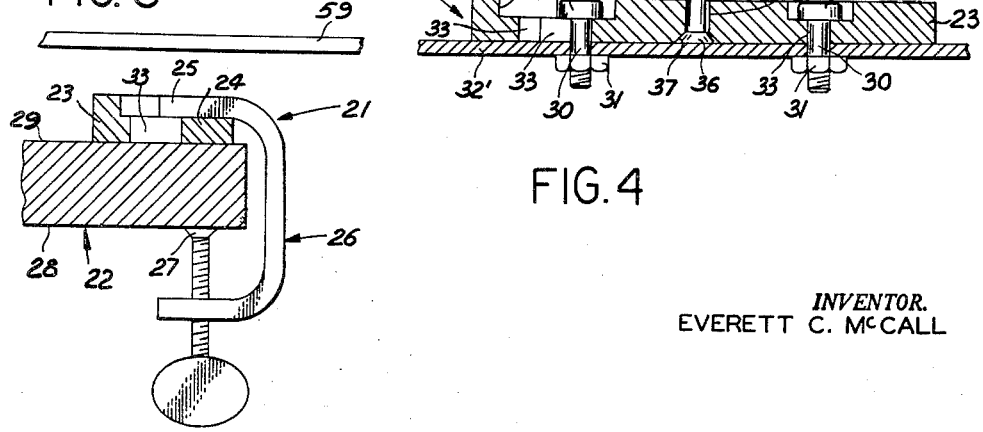
*INVENTOR.*
EVERETT C. McCALL Dec. 25, 1962 — E. C. McCALL — 3,069,933
DRILL BIT GUIDING AND LOCATING APPARATUS
Filed April 24, 1961 — 2 Sheets-Sheet 2
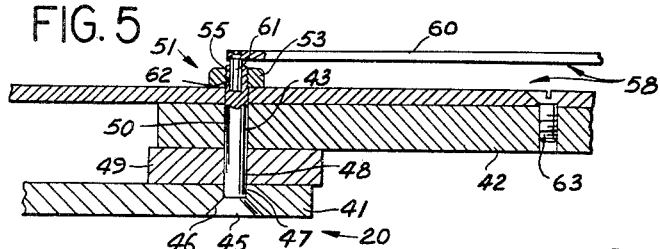
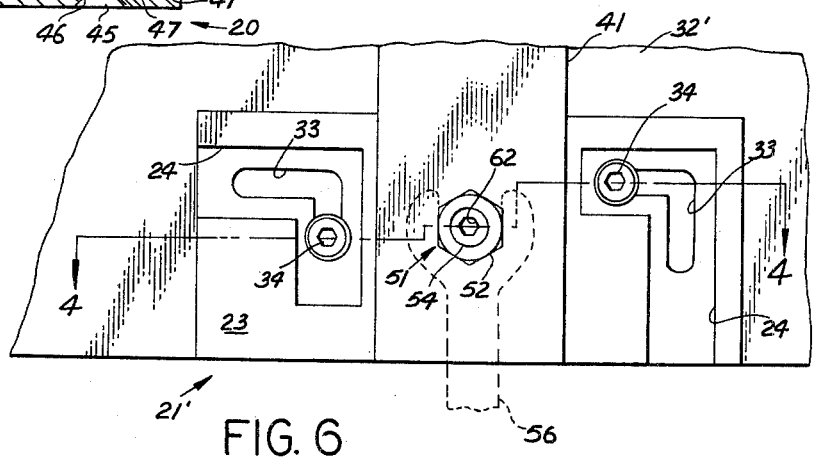
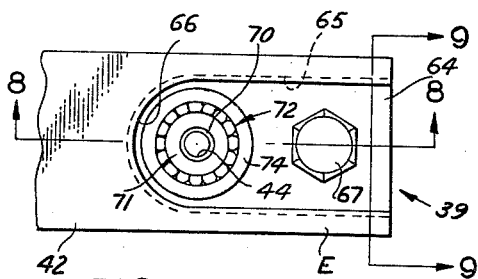
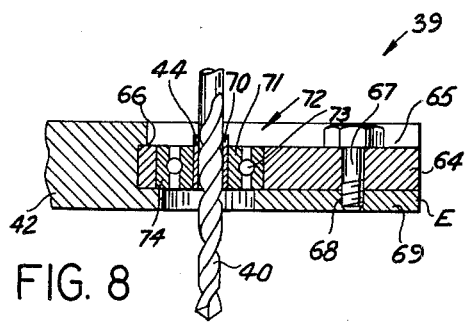
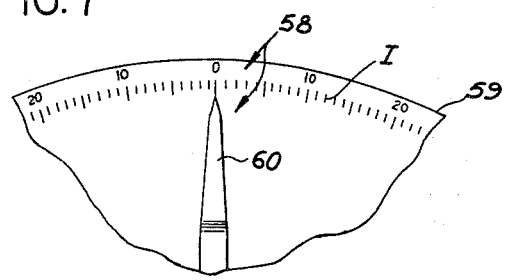
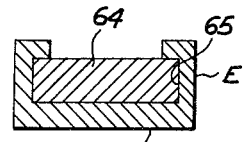
INVENTOR.
EVERETT C. McCALL United States Patent Office 3,069,933
Patented Dec. 25, 1962

3,069,933
DRILL BIT GUIDING AND LOCATING
APPARATUS
Everett C. McCall, Arlington, Calif.
(6208 Auckland Ave., North Hollywood, Calif.)
Filed Apr. 24, 1961, Ser. No. 105,067
6 Claims. (Cl. 77—62)

Generally speaking, the present invention relates to the drill and drill bit art and, more particularly, relates to a novel apparatus for guiding and/or locating a drill bit with respect to a surface which is to be drilled, and for doing so in a manner which will maintain perpendicularity to said surface and/or in a manner which will clearly indicate, on position-indicating means carried by the apparatus, one or more drill bit locations, which will make it possible to duplicate the drill bit locations whenever desired. In other words, the basic feature of the present invention is the fact that it effectively guides a drill bit, whether hand-driven or power-driven, so as to maintain true perpendicularity to a surface to be drilled. However, an additional feature of the present invention, which is present in certain specific forms of the invention, is the drill bit locating feature referred to above which makes it possible to drill a number of work pieces in a precisely identical manner and without the necessity of using a conventional drilling jig.

It is an object of the present invention to provide novel drill guiding apparatus of the character referred to above for maintaining drill bit perpendicularity with respect to a surface to be drilled irrespective of the location of the drill bit along said surface to be drilled.

It is a further object to provide a drill bit guiding apparatus of the character referred to above which includes position-indicating means operable to produce a position-indicating reading which can be duplicated whenever desired and which, when so duplicated, will reposition a drill bit in a similar location, thus making it possible to drill multiple holes in multiple work pieces with all of the holes being in precisely the same relative locations.

It is an object of the present invention to provide a drill bit guiding apparatus of the character referred to above in any of the preceding objects which is of extremely simple, cheap, foolproof construction such as to be conducive to widespread use of the apparatus.

Further objects are implicit in the detailed description which follows hereinafter for exemplary purposes only and will be apparent to persons skilled in the art after a careful study thereof.

For the purpose of clarifying the nature of the present invention, one exemplary embodiment is illustrated in the hereinbelow-described figures of the accompanying drawings and is described in detail hereinafter. However, two different modes of attachment of said exemplary embodiment are shown in different figures of the drawings.

FIG. 1 is a reduced-size perspective view of one exemplary embodiment of the present invention in attached operative relationship with respect to an auxiliary supporting member and shown in the act of guiding a drill bit in perpendicular relationship with respect to a work piece which is to be drilled and which also rests upon said auxiliary supporting member. The auxiliary supporting member is shown broken away for drawing simplification and space conservation reasons.

FIG. 2 is a fragmentary view generally similar to FIG. 1 but shows the apparatus attached directly to the work piece which is to be drilled by a different type of attachment means.

FIG. 3 is an enlarged, fragmentary, partly broken away, partly elevational and partly sectional view taken in the direction of the arrows 3—3 of FIG. 1 showing one mode of attaching the apparatus to an auxiliary supporting member.

FIG. 4 is an enlarged, fragmentary, partly broken away, partly elevational and partly sectional view taken in the direction of the arrows 4—4 of FIGS. 2 and 6 illustrating another mode of attachment of the apparatus directly with respect to a work piece which is to be drilled.

FIG. 5 is an enlarged, staggered-plane, fragmentary, partly sectional view taken in the direction of the arrows 5—5 of FIG. 2.

FIG. 6 is an enlarged, fragmentary, partly broken away top plan view (with pointer removed) taken in the direction of the arrows 6—6 of FIG. 2.

FIG. 7 is an enlarged, fragmentary, top plan view taken in the direction of the arrows 7—7 of FIG. 1, but with the drill bit removed.

FIG. 8 is a fragmentary, sectional view taken in the direction of the arrows 8—8 of FIG. 7. However, in this view the drill bit is in operative guided position within the bushing.

FIG. 9 is a sectional view taken in the direction of the arrows 9—9 of FIG. 7.

FIG. 10 is a fragmentary, top plan view taken in the direction of the arrows 10—10 of FIG. 1 illustrating one specific form of the position-indicating means which makes it possible to positively duplicate drill holes at any desired location on any desired number of work pieces.

Referring to the figures for exemplary purposes, one illustrative embodiment of the invention takes a typical exemplary form wherein it comprises adjustable extension arm means, indicated generally at 20, provided with attachment means, indicated generally at 21 in the case of FIGS. 1 and 3 and indicated generally at 21' in the case of FIGS. 2, 4 and 6.

The first attachment means, indicated generally at 21 in FIGS. 1 and 3, is adapted to fasten one end of the adjustable extension arm means 20 to an auxiliary supporting member, such as that indicated generally at 22 in FIGS. 1 and 3. In this form of the invention, the attachment means 21 comprises the base plate 23 which includes two different recess means 24, either one of which is adapted to receive the top member 25 of adjustable C-clamp means, indicated generally at 26, which carries a threadedly advanceable abutment member 27 which is adapted to be clamped against the bottom surface 28 of the auxiliary supporting member 22 while the bottom surface of the base plate 23 is adapted to be clamped against the top surface 29 of the auxiliary supporting member 22, thus firmly clamping the entire base plate 23 rigidly to the upper surface 29 of the auxiliary supporting member 22 in the manner clearly shown in FIGS. 1 and 3. Furthermore, it should be noted that the top portion 25 of the C-clamp 26 lies in the recess 24 so as to either be flush with or slightly below the top of the base plate 23.

In the arrangement illustrated in FIGS. 2, 4, and 6, the base plate 23 is attached rigidly by the bolt means 30 and the nut means 31 directly to the upper surface of the work piece 32' which is to be drilled. In this arrangement, one or more of the bolts 30 and nuts 31 may be employed and they are positioned in any portion of either of the recess means 24 which has the through slot means 33 at the bottom thereof, thus providing an arrangement where the bolt heads 34 will lie either flush with or slightly below the upper surface of the base plate 23 as is clearly shown in FIG. 4.

It should be noted that the first attachment arrangement utilizing the C-clamp 26, as shown in FIGS. 1 and 3, is primarily adapted for use when the device is to be clamped to an auxiliary supporting member such as that shown at 22 in FIGS. 1 and 3. However, the other mode of attachment shown in FIGS. 2, 4, and 6 is primarily adapted to be used when the device is to be attached directly to a work piece which is to be drilled and when such work piece is provided with holes which may be used for such attaching purposes.

The base plate 23 in either of the attachment arrangements just described is the same and is provided with pivot pin means for pivotally connecting said adjustable extension arm means, indicated generally at 20, for rotation about the axis of said pivot pin means. In the specific form illustrated, said pivot pin means is designated by the reference numeral 35 and comprises a headed pin having its head 36 lying in a countersink 37 in the bottom surface of the base plate 23 whereby to provide a flush bottom surface. Also, in the specific form illustrated, the pivot pin means 35 is driven into an aperture 38 through the base plate 23 so as to have an extremely close tolerance, tight, and non-rotative engagement therewith.

The adjustable extension arm means, indicated generally at 20, is also provided with longitudinal drill-bit-guiding and aperture-defining means, indicated generally at 39, for maintaining true perpendicularity of a drill bit such as that shown at 40 with respect to the work piece 32 in the case of FIG. 1 and 32' in the case of FIG. 2. The drill-bit-guiding means 39 also maintains parallelism of the drill bit 40 with respect to the pivot pin 35.

In the specific example illustrated, the adjustable extension arm means, indicated generally at 20, takes a particular form wherein it comprises a first arm portion 41 and a second arm portion 42 provided with pivot pin means 43 interconnecting same for rotation about the axis of the pivot pin means 43, while the first arm 41 is pivotally mounted for rotation about the axis of the pivot pin means 35; both of the pivot pins 35 and 43 being parallel to each other and also to the aperture 44 in the drill-bit-guiding means 39 and the drill bit 40 positioned therein. The pivot pin means 43 is similar to the pivot pin means 35 and is also provided with a tapered head 45 resting in a countersink 46 in the bottom surface of the first arm portion 41 whereby to provide a flush surface therewith. A portion of the shank of the pivot pin 43 extends through a hole 47 in the first arm portion 41 with an extremely close-tolerance, tight, non-rotative engagement therewith while the remainder of the pivot pin means 43 extends upwardly through aperture 48 in a spacing washer or shim 49 and rotatably through an aperture 50 in the second arm portion 42 whereby to effectively rotatably mount the second arm portion 42 with respect to the pivot pin means 43 and the first arm portion 41.

In the specific example illustrated, each of the pivotal connections of the adjustable extension arm means 20 with respect to each other and with respect to the base plate 23 by means of the pivot pin means 35 and 43, is provided with controllably operable locking means for locking the adjustable extension arm means 20 in any selected relative rotatively displaced position with respect to the two corresponding pivot pin means 35 and 43. In the specific example illustrated, said locking means is indicated generally at 51 at each of the two locations and comprises threaded lock nuts 52 and 53, respectively, threadedly engageable with the threaded upper ends 54 and 55, respectively, of the pivot pin 35 and 43 whereby to be arranged to be controllably tightened with wrench means 56 and 57, respectively, which may be permanently or removably engaged with respect to the corresponding lock nuts 52 and 53, respectively.

In the specific example illustrated, the apparatus is provided with position-indicating means designated generally by the reference numeral 58 for indicating the relative positions of each of the two arm portions 41 and 42 with respect to the corresponding non-rotative pivot pins 35 and 43. In the specific example illustrated, there are two such position-indicating means 58 for indicating the rotative positioning of the first arm portion 41 with respect to the pivot pin 35 and for indicating the rotative positioning of the second arm portion 42 with respect to the pivot pin means 43 and also with respect to the first arm portion 41. Each of said position-indicating means 58 takes the form of a circular scale plate 59 fastened, respectively, to the first arm portion 41 and the second arm portion 42. Also, each of said position-indicating means 58 includes pointer means 60 fastened by keyed pin means 61 to the upper end of the corresponding pivot pin means 35 or 43, respectively, by insertion downwardly into the keyed receptacle 62 carried by the top of said pivot pin. This provides an arrangement which allows either of the pointers 60 to be removed from the corresponding pivot pin 35 or 43, when desired, thereby making it possible to remove the corresponding lock nuts 52 and 53 for the purpose of disassembling the apparatus or for the purpose of replacing the base plate 23 with a thicker base plate in order to provide proper clearance for the drill-bit-guiding means 39 to allow it to be positioned above a thicker work piece 32 which is to be drilled. Also in certain cases, the pointers 60 and/or the scale plates 59 may be removed entirely if they are not needed. In the case of the scale plates, this is provided by removing the countersunk fastening screws 63. It should also be noted that the scale plates are provided with angle-indicating indicia such as that shown at I in FIG. 10.

It should be noted that the spacing washer 49 provides vertical clearance sufficient to allow the second arm portion 42 to rotate completely around the pivot pin 43 and move directly over the top of the other pivot pin 35, the lock nut 52, the scale plate 59, and the pointer 60. In other words, complete 360-degree rotation of both of the arm portions 41 and 42 is possible with the structural arrangement disclosed. However, it should be noted that in certain forms of the invention, this complete 360-degree rotation of the arm portion 42 directly over the top of the pivot pin 35, the lock nut 52, and the pointer 60 may not be possible. This may be so because the pivot pin means 35 may be made substantially longer so as to extend a considerable distance above the top of the arm portion 41 so that said arm portion 41 can be vertically slidably moved on the upper part of the extended pivot pin means 35 and either manually held in such vertically lifted position or retained there by threaded lock nut means, or the like, in order to provide the equivalent of replacing the base plate 23 with a thicker base plate—in other words, in order to vertically space the drill-bit-guiding means 39 a greater distance above the work piece to be drilled.

In the specific example illustrated, the drill-bit-guiding means, indicated generally at 39, comprises a mounting member or portion 64 which is adapted to be inserted into a receiver portion or means 65 carried by the remote end E of the second arm portion 42 whereby to allow the mounting portion 64 to be slidably inserted into the position shown in FIGS. 1, 7, 8, and 9 where the rear end thereof lies under a retaining lip 66, and to then be fastened by fastening screw means 67 to the tapped hole 68 in the bottom wall portion 69 of said remote end portion E of the second arm portion 42. This will solidly lock the mounting portion 64 in the fully inserted position shown in FIGS. 1 and 7-9 until such time as the fastening screw 67 is removed, after which the member 64 can be slidably removed and replaced, if desired, by a different mounting portion 64 defining a different size aperture 44 therein for drill-guiding cooperation with a different size of drill bit 40. In the specific example illustrated, the lip 66 and the fastening screw 67 and tapped aperture 68 comprise controllably engageable fastening means for fastening said mounting portion 64 in said receiver means 65.

Also, in the specific example illustrated, the aperture 44 is defined by longitudinal rotatably mounted bushing means 70 fastened to the inner element 71 of the bearing means, indicated generally at 72, and abutting the inner surfaces of ball-bearing means 73 which are retained by the outer ball bearing race member 74, which in turn is fastened to the mounting portion 64. This arrangement allows the bushing or sleeve 70 to slidably and guidably engage the bit 40 and to rotate therewith during drilling rotation of the bit 40 by either a power drill or a hand-operated drill such as a brace, or the like, whereby to maintain true perpendicularity of the drill bit 40 with respect to the surface of the work piece 32 or 32'.

It should be noted that the end E of the arm portion 42 may, in certain instances, be supported during a drilling operation by a spacer or block such as that shown in broken lines at S in FIGS. 1 and 2. However, the invention is not specifically so limited.

It will be noted that the novel drill bit guiding and locating apparatus of the present invention provides numerous advantages of the type briefly indicated hereinbelow for exemplary purposes. It can be used in lieu of a drill press and is substantially less bulky than a drill press and is very much more flexible, as to the adjustability of the drill bit location, than a drill press. It can duplicate any part by the use of numbers corresponding to those on the two scale plates 59 and by numbers indicating drill sizes. These specifications may be listed on cards or other recording media, and may fully specify all of the necessary information to duplicate a drilled part—and may do so without the necessity of seeing or using the original part. It can be used for drilling holes overhead and near corners with or without an angle drill motor. It can drill similarly located holes in separate elements of a subassembly so accurately that they can be easily assembled with the holes being so accurately aligned as to provide an extremely close tolerance or precision fit for through bolts or fasteners attaching the elements of the assembly together. The arm means 20 can effectively swing or pass over an extrusion and drill as close to the side thereof as desired. The apparatus can be used with a drill press or "Bridgeport" without building any angle jigs. The apparatus can also be used with a recorder to initially dictate and record and to subsequently reproduce various numbers required to provide proper sizes and locations of drill holes at various sequential steps during the production of a finished work piece. This can be under the control of a switch to be operated at each successive step during the production of the finished object.

It should be noted that the drill-bit-guiding means 39 and the controllably engageable fastening means may be modified substantially within the basic spirit and scope of the present invention. This is also true of the pivotal junctions provided by the pivot pin means 35 and 43 and lock nut means for locking same.

It should also be noted that various other types of position-indicating means may be employed and, in certain cases, may be eliminated entirely. It should also be noted that numerous different types of clamping means may be employed within the basic spirit and scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Drill-bit-guiding apparatus for maintaining drill bit perpendicularity to a surface to be drilled and for indicating the location of holes in a relocatable manner, comprising: adjustable extension arm means including attachment means at one end for attachment with respect to a supporting surface of an auxiliary supporting member, and including perpendicularly directed longitudinal drill-bit-guiding and aperture-defining rotatably mounted bushing means at the opposite end, said adjustable extension arm means comprising a first arm portion and a second arm portion provided with perpendicularly directed pivot pin means interconnecting same for rotation about the axis of said pivot pin means, said attachment means comprising a base plate provided with perpendicularly directed pivot pin means pivotally connecting same to one end of said first arm portion for rotation about the axis of said pivot pin means, each of said pivot pin means rotatably engaging the corresponding arm portion end with a close tolerance rotative fit whereby to maintain true parallelism of the aperture-defining bushing means with each of said pivot pin means; position-indicating means for indicating the position of the drill-bit-guiding means relative to said attachment means; and controllable operable locking means for locking the adjustable extension arm means in any selected position.

2. Apparatus of the character defined in claim 1, wherein said position-indicating means comprises a first scale plate carried by said first arm portion adjacent to said second-mentioned pivot pin means, a second scale plate carried by said second arm portion adjacent to said first-mentioned pivot pin means interconnecting said first and second arm portions, a first pointer member non-rotatably carried by said second-mentioned pivot pin means and extending over said first scale plate, and a second pointer member non-rotatably carried by said first-mentioned pivot pin means and extending over said second scale plate.

3. Apparatus of the character defined in claim 1, wherein said base plate of said attachment means includes recess means and C-clamp means cooperable therewith and cooperable with said auxiliary supporting member for rigid attachment of said base plate thereto with a portion of said clamp means lying in said recess means in a flush-surface manner.

4. Apparatus of the character defined in claim 1, wherein said base plate of said attachment means includes through-aperture means provided with enlarged countersink means at the top thereof for the reception of threaded fastener means for attaching said base plate to corresponding aperture means in said auxiliary supporting member.

5. Apparatus of the character defined in claim 1, wherein said drill-bit-guiding and aperture-defining longitudinal rotatably mounted bushing means is provided with a mounting portion, and wherein said opposite end of said adjustable arm means is provided with receiver means removably receiving and mounting said mounting portion and controllably engageable fastening means fastening said mounting portion in said receiver means.

6. Apparatus of the character defined in claim 1, wherein said locking means comprises lock nut means threadedly engaging said first-mentioned pivot pin means for immobilizing said second arm portion with respect to said first arm portion and lock nut means threadedly engaging said second-mentioned pivot pin means for immobilizing said first arm portion with respect to said base plate.

References Cited in the file of this patent

UNITED STATES PATENTS

| | | |
|---|---|---|
| 683,664 | Schramek et al. | Oct. 1, 1901 |
| 1,138,767 | McCormack | May 11, 1915 |
| 2,341,418 | Atkins | Feb. 8, 1944 |
| 2,428,201 | Carnarili et al. | Sept 30, 1947 |